US010362063B2

(12) United States Patent
Smith et al.

(10) Patent No.: US 10,362,063 B2
(45) Date of Patent: Jul. 23, 2019

(54) POLICY ENFORCEMENT IN A SECURE DATA FILE DELIVERY SYSTEM

(71) Applicant: AXWAY INC., Phoenix, AZ (US)

(72) Inventors: Jeffrey C. Smith, Atherton, CA (US); Jean-Christophe Denis Bandini, Brussels (BE)

(73) Assignee: Axway Inc., Phoenix, AZ (US)

( * ) Notice: Subject to any disclaimer, the term of this patent is extended or adjusted under 35 U.S.C. 154(b) by 0 days.

(21) Appl. No.: 15/437,093

(22) Filed: Feb. 20, 2017

(65) Prior Publication Data

US 2017/0230423 A1    Aug. 10, 2017

Related U.S. Application Data

(63) Continuation of application No. 13/481,549, filed on May 25, 2012, now Pat. No. 9,578,059, which is a (Continued)

(51) Int. Cl.
| | |
|---|---|
| *H04L 29/06* | (2006.01) |
| *G06F 16/951* | (2019.01) |
| *H04L 29/08* | (2006.01) |

(52) U.S. Cl.
CPC ........... *H04L 63/20* (2013.01); *G06F 16/951* (2019.01); *H04L 63/0227* (2013.01); (Continued)

(58) Field of Classification Search
CPC ..... H04L 63/20; H04L 63/083; H04L 63/145; H04L 63/0227; H04L 63/1408; G06F 2221/2101
See application file for complete search history.

(56) References Cited

U.S. PATENT DOCUMENTS

| | | | |
|---|---|---|---|
| 5,481,720 A | | 1/1996 | Loucks et al. |
| 5,493,692 A | * | 2/1996 | Theimer .............. G06Q 10/107 340/5.74 |

(Continued)

FOREIGN PATENT DOCUMENTS

| | | |
|---|---|---|
| DE | 19832433 A1 | 2/1999 |
| EP | 0833492 A2 | 9/1996 |

(Continued)

OTHER PUBLICATIONS

C. E. Landwehr and D. M. Goldschlag, "Security issues in networks with Internet access," in Proceedings of the IEEE, vol. 85, No. 12, pp. 2034-2051, Dec. 1997. (Year: 1997).*

(Continued)

*Primary Examiner* — Kari L Schmidt
(74) *Attorney, Agent, or Firm* — Haynes and Boone, LLP

(57) ABSTRACT

A server interacts with a sender to form a package which can include one or more attached data files to be sent to one or more recipients, and the server applies a policy established by a policy authority of the sender to the package. Since the server both forms the package through interaction with the sender and applies the policy, violations of the policy by the package can be brought to the sender's attention during an interactive session with the sender and before encryption of all or part of the package. As a result, the sender is educated regarding the policy of the sender's policy authority, and the sender can modify the package immediately to comport with the policy. The server delivers the package to intended recipients by sending a notification to each recipient and including package identification data, e.g., a URL by which the package can be retrieved.

17 Claims, 10 Drawing Sheets

Related U.S. Application Data continuation of application No. 10/790,901, filed on Mar. 1, 2004, now Pat. No. 8,196,183, which is a continuation of application No. 09/540,023, filed on Mar. 31, 2000, now Pat. No. 6,826,609.

(52) U.S. Cl.
CPC .......... *H04L 63/083* (2013.01); *H04L 63/145* (2013.01); *H04L 63/1408* (2013.01); *H04L 67/06* (2013.01); *H04L 67/325* (2013.01); *H04L 69/329* (2013.01); *G06F 2221/2101* (2013.01); *H04L 67/2842* (2013.01)

(56) References Cited

U.S. PATENT DOCUMENTS

| | | | |
|---|---|---|---|
| 5,627,764 A * | 5/1997 | Schutzman | G06N 5/022 709/207 |
| 5,671,412 A | 9/1997 | Christiano | |
| 5,724,575 A | 3/1998 | Hoover et al. | |
| 5,771,355 A | 6/1998 | Kuzma | |
| 5,781,614 A * | 7/1998 | Brunson | H04L 29/06 379/88.14 |
| 5,781,901 A | 7/1998 | Kuzma | |
| 5,790,793 A | 8/1998 | Higley | |
| 5,802,253 A | 9/1998 | Gross et al. | |
| 5,884,033 A | 3/1999 | Duvall et al. | |
| 5,903,723 A | 5/1999 | Beck et al. | |
| 5,963,915 A | 10/1999 | Kirsch | |
| 5,978,837 A | 11/1999 | Foladare et al. | |
| 5,987,473 A | 11/1999 | Jorgensen et al. | |
| 5,995,597 A | 11/1999 | Woltz et al. | |
| 5,999,932 A | 12/1999 | Paul | |
| 6,021,427 A | 2/2000 | Spagna et al. | |
| 6,040,784 A | 3/2000 | Miller | |
| 6,052,723 A * | 4/2000 | Ginn | G06Q 50/01 709/223 |
| 6,067,561 A | 5/2000 | Dillon | |
| 6,073,142 A | 6/2000 | Geiger et al. | |
| 6,073,165 A | 6/2000 | Narasimhan et al. | |
| 6,131,120 A | 10/2000 | Reid | |
| 6,157,630 A | 12/2000 | Adler et al. | |
| 6,182,118 B1 * | 1/2001 | Finney | H04L 51/12 709/206 |
| 6,185,551 B1 * | 2/2001 | Birrell | G06Q 10/107 |
| 6,192,396 B1 * | 2/2001 | Kohler | G06Q 10/107 707/999.005 |
| 6,199,102 B1 | 3/2001 | Cobb | |
| 6,199,103 B1 | 3/2001 | Sakaguchi et al. | |
| 6,202,157 B1 | 3/2001 | Brownlie et al. | |
| 6,240,088 B1 | 3/2001 | Gayton et al. | |
| 6,219,694 B1 | 4/2001 | Lazaridis et al. | |
| 6,233,618 B1 | 5/2001 | Shannon | |
| 6,263,064 B1 | 7/2001 | O'Neal et al. | |
| 6,275,575 B1 | 8/2001 | Wu | |
| 6,275,937 B1 * | 8/2001 | Hailpern | G06F 21/566 709/201 |
| 6,282,565 B1 | 8/2001 | Shaw et al. | |
| 6,285,777 B2 | 9/2001 | Kanevsky et al. | |
| 6,304,898 B1 | 10/2001 | Shiigi | |
| 6,321,267 B1 | 11/2001 | Donaldson | |
| 6,330,677 B1 * | 12/2001 | Madoukh | G06F 21/445 726/2 |
| 6,353,886 B1 | 3/2002 | Howard et al. | |
| 6,360,254 B1 | 3/2002 | Linden et al. | |
| 6,363,140 B1 | 3/2002 | Pinard | |
| 6,421,709 B1 | 7/2002 | McCormick et al. | |
| 6,424,828 B1 | 7/2002 | Collins et al. | |
| 6,438,215 B1 | 8/2002 | Skladman et al. | |
| 6,442,686 B1 * | 8/2002 | McArdle | H04L 51/12 713/151 |
| 6,446,118 B1 | 9/2002 | Gottlieb | |
| 6,460,074 B1 * | 10/2002 | Fishkin | G06Q 10/107 709/206 |
| 6,463,462 B1 | 10/2002 | Smith et al. | |
| 6,487,594 B1 * | 11/2002 | Bahlmann | G06Q 30/0601 705/26.1 |
| 6,529,942 B1 * | 3/2003 | Gilbert | H04L 12/1886 709/206 |
| 6,532,489 B1 | 3/2003 | Merchant | |
| 6,560,644 B1 | 5/2003 | Lautmann et al. | |
| 6,567,914 B1 | 5/2003 | Just et al. | |
| 6,571,290 B2 | 5/2003 | Selgas et al. | |
| 6,591,263 B1 | 7/2003 | Becker et al. | |
| 6,601,102 B2 | 7/2003 | Eldridge et al. | |
| 6,606,647 B2 | 8/2003 | Shah et al. | |
| 6,609,106 B1 | 8/2003 | Robertson | |
| 6,609,196 B1 * | 8/2003 | Dickinson, III | H04L 51/12 380/259 |
| 6,618,747 B1 | 9/2003 | Flynn et al. | |
| 6,636,965 B1 * | 10/2003 | Beyda | H04L 63/0428 709/206 |
| 6,643,684 B1 * | 11/2003 | Malkin | H04N 1/32037 379/905 |
| 6,671,810 B1 * | 12/2003 | Jardin | H04L 63/0428 726/3 |
| 6,691,231 B1 * | 2/2004 | Lloyd | H04L 63/0428 713/164 |
| 6,745,231 B1 * | 6/2004 | Megiddo | H04L 63/18 380/255 |
| 6,941,304 B2 * | 9/2005 | Gainey | G06Q 10/107 |
| 7,100,206 B1 * | 8/2006 | Pere | G06F 21/6245 713/185 |

FOREIGN PATENT DOCUMENTS

| | | |
|---|---|---|
| WO | WO 9905814 | 2/1999 |
| WO | WO 9906929 | 2/1999 |
| WO | WO 9917241 | 4/1999 |
| WO | WO 9963709 | 12/1999 |
| WO | WO 9965256 | 12/1999 |
| WO | WO 0008793 A | 2/2000 |
| WO | WO 088793 | 2/2000 |
| WO | WO 0041366 | 7/2000 |
| WO | WO 0176181 A3 | 10/2001 |

OTHER PUBLICATIONS

Levy, Eliezer, and Abraham Silberschatz. "Distributed file systems: Concepts and examples." ACM Computing Surveys (CSUR) 22.4 (1990): 321-374. (Year: 1990).*

M. Blaze, J. Feigenbaum and J. Lacy, "Decentralized trust management," Proceedings 1996 IEEE Symposium on Security and Privacy, Oakland, CA, USA, 1996, pp. 164-173. (Year: 1996).*

Palme et al., "Issues When Designing Filters in Messaging Systems," Computer Communications, Elsevier Science Publishers BV: Amsterdam, NL, vol. 19, No. 2, Feb. 1, 1996, pp. 95-101.

Hofrichter, et al., "The BERKOM Multimedia-Mail Teleservice", Proceedings of the Fourth Workshop Future Trends of Distributed Computing Systems, Sep. 22-24, 1993, IEEE Computer Society Press.

Moeller et al., "The BERKOM Multimedia-Mail Teleservice", Computer Communications, vol. 18, No. 2, Feb. 1995.

* cited by examiner

POLICY ENFORCEMENT IN A SECURE DATA FILE DELIVERY SYSTEM

CROSS REFERENCE TO RELATED APPLICATIONS

This application is a continuation of U.S. patent application Ser. No. 13/481,549 filed May 25, 2012, now U.S. Pat. No. 9,578,059, which is a continuation of U.S. patent application Ser. No. 10/790,901 filed Mar. 1, 2004, now U.S. Pat. No. 8,196,183, which is a continuation of U.S. patent application Ser. No. 09/540,023, filed Mar. 31, 2000, now U.S. Pat. No. 6,826,609, each of which is incorporated by reference herein.

FIELD OF THE INVENTION

The invention relates to data transfer through computer networks and, in particular, to a mechanism by which policies of an organization can be enforced upon packages of data files delivered on behalf of members of the organization.

BACKGROUND OF THE INVENTION

The Internet has grown tremendously in recent years, both in terms of number of users and the amount of data transferred through the Internet. Originally, the Internet was a data transfer medium for academia. Eventually, engineers and private users increasingly used and became more familiar with the Internet. More and more, the Internet is becoming an acceptable communication medium for business. However, business users demand more confidentiality and traceability of communication than do private users engaging in personal correspondence. In addition, business organizations have a strong interest in protecting confidential material and ensuring secrecy and propriety of communications of employees.

Business users often communicate sensitive, confidential, and proprietary information and, accordingly, expect such communication to be secure from unauthorized eavesdropping. In addition, business users expect to be able to store records tracing correspondence. Accordingly, to provide a medium for business communication, Internet-based communication must be made secure and traceable. In addition, inappropriate use by employees of employer-supplied communications through the Internet can harm the employer in a number of ways. For example, employees can breach the employer's security through unauthorized disclosure of confidential documents. In addition, employees can abuse such employer-supplied communication for personal benefit resulting in excessive use of costly resources. Furthermore, communications of an inappropriate nature, e.g., sexually explicit materials, or communications containing malicious computer instructions can potentially result in legal liability of the employer.

What is needed is a secure, traceable data file delivery system in which policies of an organization can be enforced against members of the organization as senders of such data files.

SUMMARY OF THE INVENTION

In accordance with the present invention, a server interacts with a sender to form a package which can include one or more attached data files to be sent to one or more recipients, and the server applies a policy established by a policy authority of the sender to the package. The policy authority of the sender is an entity authorized to establish policy for the sender and is typically the entity which provides the sender with access to the package delivery system in which the policy is enforced. The sender's policy authority can be the sender's employer, for example. Since the server both forms the package through interaction with the sender and applies the policy, any violations of the policy by the package can be brought to the sender's attention during an interactive session with the sender. As a result, the sender is educated regarding the policy of the sender's policy authority, and the sender can modify the package immediately to comport with the policy.

An additional advantage is realized by a particular embodiment in which the sender interacts with the server through HTTP/HTTPS and the World Wide Web. Specifically, the sender can form a package from any computer system coupled to the ubiquitous network—including a computer at the sender's office, a computer at the sender's home, a publicly available computer at a public library, a rented computer at a copy/printing service center, or publicly installed Internet kiosks (e.g., >STREETSPACE kiosks—http://www.streetspace.com). Regardless which computer the sender uses to create a package, the policy of the sender's policy authority is applied to the package. Such is important since the recipient of such a package generally cannot perceive from the package itself which of the computers was used by the sender to create the package and the sender can be presumed, by such a recipient, to be sending the package from the sender's office and therefore acting with the tacit approval of the sender's policy authority.

In addition to forming the package through interaction with the sender and applying policy to the package, the server delivers the package to the one or more intended recipients. Such delivery includes sending notification to each recipient and including in such notification package identification data, e.g., a URL by which the package can be retrieved. Each recipient submits the package identification data to the server and, in response thereto, the server presents to the requesting recipient the opportunity to retrieve the package. The notification message can be sent as e-mail via SMTP, and the package identification can be received by the server as a URL through HTTP.

The policy of the policy authority can be specified as a list of associations between one or more conditions and one or more actions to be carried out upon satisfaction of the associated conditions. Each condition includes a boolean expression involving one or more sender attributes, recipient attributes, package attributes, and/or environmental attributes. Sender and recipient attributes can include regular expressions involving e-mail addresses by which each is specified or can include attributes of user records specifying each. User record attributes can be particularly useful in categorizing the sender and the recipients as belonging to particular divisions within the policy authority, although it is appreciated that e-mail addresses can sometimes provide similar information.

Package attributes include message attributes, delivery attributes, post delivery attributes, and attached data files. Message attributes include a subject and a message body. Conditions involving message attributes can be used to detect private and confidential information in a package and/or inappropriate content such as sexually explicit language. Delivery attributes include such things as package delivery priority, security options, and delivery timing. Conditions involving delivery attributes can detect packages using options which are below a desirable level of security or which result in excessive cost to the policy authority. Post delivery attributes specify actions a recipient can take with respect to the received package including replying to the sender of the package, replying to the sender of the package at the expense of the sender, forwarding the package to one or more other recipients, saving the package to local persistent storage, and printing the contents of the package. Each post delivery attribute can involve a security risk and/or extra cost to the policy authority. Accordingly, conditions can be configured to detect specific uses of post delivery attributes. Attached data files can include confidential information, can include inappropriate material, can be excessive in size (and therefore excessive in cost to the policy authority), and can include malicious computer instructions in the form of viruses or Trojan horses for example. Conditions can detect specific conditions of data files attached to the package.

Actions can interrupt delivery of the package, log handling of the package, or modify the package. Examples of interrupting actions include blocking delivery of the package outright, blocking the package pending review by the policy authority, or delaying delivery of the package. Logging actions can include, for example, saving a copy of the package, sending a copy of the package to a predetermined recipient, and notifying a predetermined entity (perhaps the sender) of another action taken with respect to the package. Modification actions can modify the package by changing the subject, the message, delivery attributes, post delivery attributes, and the attached data files. For example, all attached data files can be removed or only those attached data files which satisfy a particular set of conditions can be removed.

DETAILED DESCRIPTION

Figure 1:
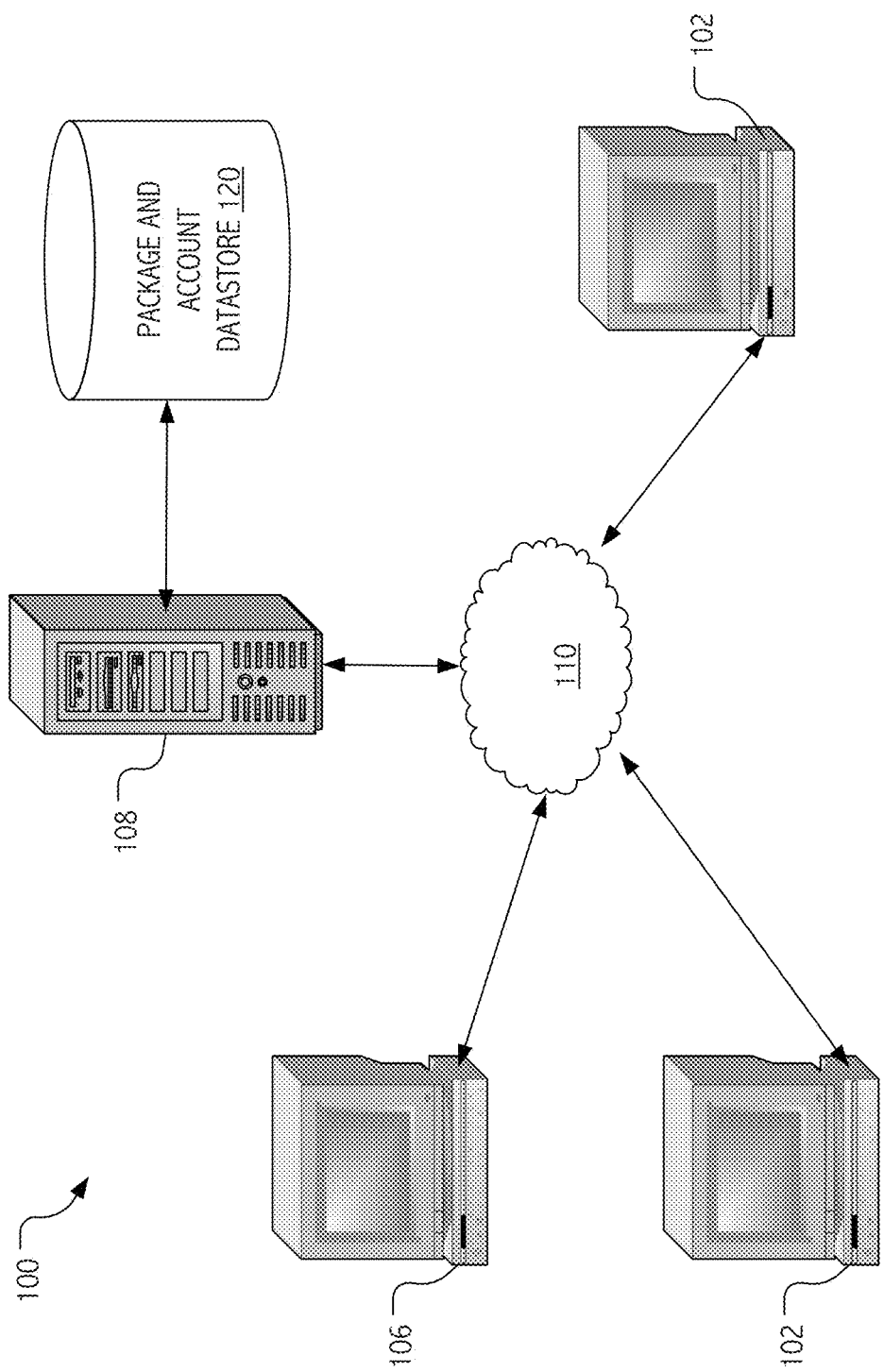
FIG. 1 is a block diagram of a delivery system in accordance with the present invention.

In accordance with the present invention, a sender associated with computer system 102 sends a package containing one or more data files to a recipient using computer system 104 through secure data file delivery protocols while policy established by a policy authority is applied to the package. In this illustrative example, policy is specified by the policy authority through a computer system 106. The package is transferred by the sender to a server 108 for temporary storage in a datastore 120. Server 108 enforces policies with respect to the package in a manner described more completely below in accordance with polices specified by the policy authority of the sender. In delivering the package to the recipient server 108 sends an e-mail notification through a computer network 110 to the recipient at computer system 104. In response to the notification, the recipient retrieves the package from server 108 through computer network 110.

A number of advantages are provided by the policy enforcement mechanism described herein. First, server 108 performs dual functions, namely, interaction with the sender in creating the package and enforcement of policy upon that package. Accordingly, any policy violation can be communicated to the sender immediately during such interaction and the package can immediately be corrected to conform to policy. Second, server 108 can be configured to enforce policy through a wide area network such as the Internet such that policy can be enforced over a very large geographical area and several geographically dispersed offices of the policy authority. These advantages are described more completely below in conjunction with various details of document delivery and policy enforcement system 100.

A data file can contain any type of computer-readable data such as text, graphical images, motion video, audio signals, database records, etc. Data files can be stored in any of a number of computer-readable storage media and can be transferred through a computer network such as computer network 110. Computer network 110 can be either a local area network or a wide area network. In one illustrative example, computer network 110 is the Internet.

As described above, the policy authority specifies policy for itself and its members, e.g., the sender, to server 108 through computer system 106 and computer network 110. A policy authority is an entity that is authorized to establish policies for a number of users of system 100. For example, the policy authority can be the employer of the sender or an Internet service provider of the sender. Typically, the policy authority is the entity providing the sender access and use of system 100. Computer system 106 of the policy authority and computer system 102 of the sender can be coupled to one another through a local area network (not shown) which is in turn coupled to computer network 110; however, such is not necessary as indicated in FIG. 1.

Figure 2:
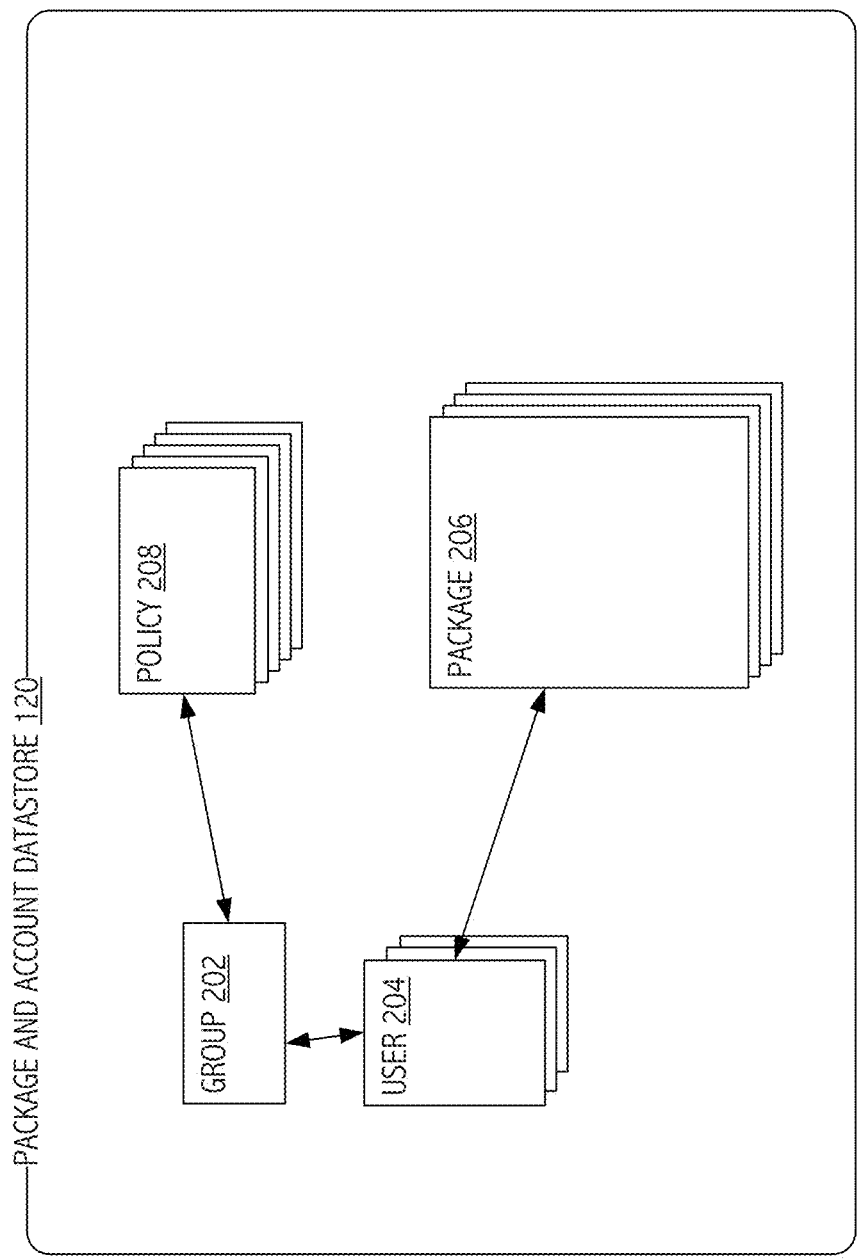
FIG. 2 is a block diagram of the package and account datastore of FIG. 1 in greater detail.

As described briefly above, datastore 120 stores packages to be delivered. Datastore 120 is shown in greater detail in FIG. 2. Datastore 120 includes a group record 202 which represents a group of users of package delivery and policy enforcement system 100. An organization, such as the policy authority, which is authorized to use package delivery and policy enforcement system 100 (FIG. 1), can group its members into one or more groups represented by group records such as group record 202 (FIG. 2). Members of the organization are users of package delivery and policy enforcement system 100 and are each represented by a user record 204. For example, user record 204 can represent the sender.

As used herein, a user of system 100 can be either a human user or a computerized user. A computerized user is all or part of one or more computer processes and can send and/or receive packages through server 108 and computer network 110. It should be understood that, like the sender, the one or more recipients described in this illustrative embodiment can be either human users or computerized users.

Group record 202 is associated with one or more policy records 208. Each policy record 208 represents a number of rules to be applied to packages sent by users associated with one or more groups, e.g., group record 202, in a manner described more completely below. In addition, each policy record, e.g., policy record 208, can be associated with more than one group.

Each user, such as the sender, can create one or more packages for delivery to another user, e.g., the recipient, who may or may not be a member of the organization represented by group record 202. Each such package is represented by a package record 206. The policies represented by policy records 208 are applied to all packages associated with users associated with group record 202.

Figure 3:
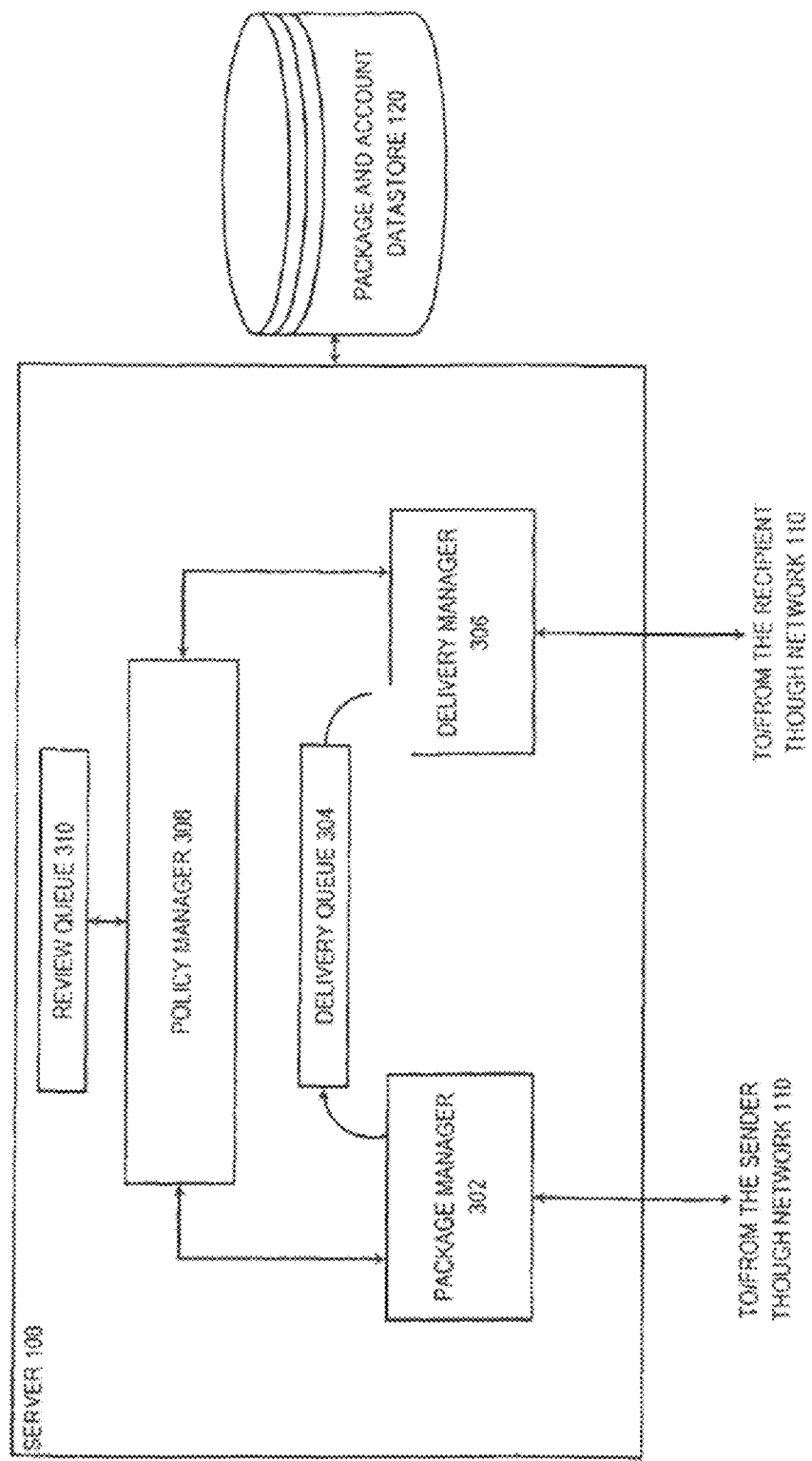
FIG. 3 is a block diagram of the server of FIG. 2 in accordance with the present invention.

Server 108 is shown in greater detail in FIG. 3 and includes a package manager 302, a delivery queue 304, a delivery manager 306, and a policy manager 308. It should be noted that, while server 108 is shown as a single computer system coupled to computer network, server 108 can be several computer systems which cooperate with one another, perhaps through computer network 110, to provide the services described herein. For example, each of package manager 302, delivery manager 306, and policy manager 308 can be implemented within a separate respective computer system or collection of computer systems. However, to provide the services described herein in an efficient manner, it is preferred that package manager 302, delivery manager 306, and policy manager 308 interact through relatively quick, efficient channels, e.g., with low latency and relatively high bandwidth.

To create a package, the sender accesses package manager 302 through computer network 110. In should be noted that, to create a package, the sender accesses package manager 302 from any location. For example, the sender may have access to multiple computer systems including a computer system at work, a computer system at home, and computer systems available publicly, e.g., at airports, libraries, and hotels. In this illustrative example, the sender accesses package manager 302 through a web browser and package manager 302 interacts with the user through a web server, e.g., using HTML forms. Web browsers, web servers, and HTML (HyperText Markup Language) forms are known computer and/or software components used currently in conjunction with the well-known World Wide Web of the Internet. As a result, the sender can create a package from any computer system which is capable of accessing the World Wide Web through a web browser.

The interaction by which the sender creates a package through a web browser interface is described more completely in U.S. patent application Ser. No. 08/957,986 by Jeffrey C. Smith, Jean-Christophe Bandini, and Randy Shoup for "Method and Apparatus for Delivering Documents over an Electronic Network" on Oct. 2, 1997 and that description is incorporated herein by reference. A package created by the sender as represented by package record 206 is described in greater detail below in conjunction with FIG. 7. Briefly, the package include address data specifying one or more recipients, subject and message data, delivery and post handling specification data, and can include one or more attached data files.

When a package is complete, package manager 302 places the completed package on delivery queue 304 for delivery to the one or more recipients specified in the completed package. Delivery manager 306 retrieves packages from delivery queue 304 and sends those packages to recipients specified in each package. Delivery manager 306 effects such delivery by forming and sending a notification message, by SMTP (Simple Mail Transfer Protocol) for example, to each recipient. Such notification messages include package retrieval data, in the form of a private universal resource locator (PURL) in this illustrative example, by which each recipient can retrieve the package through the World Wide Web according to the HyperText Transfer Protocol (HTTP), for example. Such notification and retrieval using PURLs is described more completely in U.S. patent application Ser. No. 09/353,164 by Jeffrey C. Smith and Jean-Christophe Bandini for "Electronic Document Delivery System in which Notification of Said Electronic Document is Sent to a Recipient Thereof" on Jul. 14, 1999 and that description is incorporated herein by reference.

In this illustrative example, policy manager 308 is coupled to both package manager 302 and delivery manager 306. In alternative embodiments, policy manager 308 can be coupled to either package manager 302 or delivery manager 306 alone. In any of these embodiments, it should be noted that policy manager 308 is able to enforce policy upon packages created by the sender regardless of which computer system the sender is using to create the package. As described briefly above, the sender can use any computer system coupled to the World Wide Web of the Internet to create a package through interaction with package manager 302. Thus, policy set by the policy authority can be enforced upon the sender whether the sender is creating and sending packages from work, from home, from a public library, from a hotel, or from anywhere else so long as package manager 302 is used to create the package.

In interacting with package manager 302, policy manager 308 assures that packages created by the sender comport with policies established by the policy authority of the sender and represented in policy record 208, for example. One advantage of enforcing policy with package manager 302 is that any violations of policy can be immediately reported to the sender during interaction between the sender and package manager 302. Accordingly, the sender can immediately alter the package to comply with policy established by the sender's policy authority. In addition, future violations of policy are less likely since the immediate feedback to the sender forms a more permanent impression upon the sender's memory.

In this way, policy enforcement by policy manager 308 is conducted in an interactive session of package generation with the user. The session is interactive since the sender submits the package, e.g., by pressing a "SUBMIT" button in a graphical user interface (GUI), and continues to monitor responses from package manager 302 until an acknowledgment message is received. Such an acknowledgment message can indicate, for example, that the package has successfully been submitted for delivery. By interacting with package manager 302 to enforce policy, policy manager 308 can cause package manager 302 to issue a negative acknowledgment to the sender if the submitted package violates policy. The negative acknowledgment can indicate to the sender that the submitted package violates policy and can further specify the nature of the violation, e.g., by specifying the conditions met by the package which are considered a violation of policy. The immediacy of such feedback allows the sender to correct any policy violations in the package and resubmit the package before the sender has terminated interaction with package manager 302 to go perform other tasks.

In addition, by immediately applying policy during an interactive session with the sender enables application of policy before a package is encrypted for secure delivery. For security and confidentiality of the package during delivery, the package and/or any data files attached to the package can be encrypted after submission by the sender. Once the package and/or attached data files are encrypted, application of policy—e.g., to scan for malicious computer instructions or inappropriate language—is a practical impossibility. Applying policy to the package contemporaneously with submission of the package allows policy to be applied to the package while the package is still in cleartext form.

In this illustrative embodiment, server 108 performs such encryption and, if application of policy in conjunction with delivery manager 306 is desirable, can decrypt the package and/or attached data files for such application of policy and re-encrypt the package and/or attached data files after such application.

Understanding the benefits of conducting policy enforcement during an interactive session are more fully appreciated by considering policy enforcement of SMTP messages which have been sent by a sender. The sender configures the messages and submits the message, e.g., by pressing a "SEND" GUI button. At that point, the message may be sent immediately by SMTP to an SMTP server, or the message may be queued in the sender's e-mail client until some later time at which the e-mail reader connects with the SMTP server. In either event, the sender may continue to read and/or compose e-mail messages or may leave the e-mail reader to perform other tasks. Once the "SEND" GUI button is pressed, the sender considers the e-mail message to be en route. The policy enforcement is not carried out by the e-mail reader by which the sender composes the message but is instead conducted by a node along the SMTP routing path. Feedback regarding policy violations of such an SMTP e-mail message is typically received significantly later while the sender has gone off to perform other tasks.

In addition, the message is encrypted, if at all, by the e-mail reader by which the sender composed the message. Accordingly, the SMTP server which sends the message on its way to the one or more recipients cannot apply policy to the contents of the message which are encrypted. Since the encryption is performed by the e-mail reader of the sender, the SMTP server attempting to apply policy has insufficient information to decrypt the message and/or attached data files to properly apply policy. As a result, encryption allows inappropriate and/or confidential information to be sent without detection by policy enforcement through SMTP servers.

Furthermore, policy enforcement along an SMTP delivery path assumes that the message will travel along such a path. If the sender sends e-mail from home or from some publicly available computer system while policy enforcement is carried out at an SMTP server coupling the sender's office computer system to the Internet, the policy installed at the SMTP server is not applied to the e-mail message.

Some policies require substantial processing resources to enforce. One example of such a policy is the scanning of attached data files for viruses, Trojan horses, and/or other forms of malicious computer instructions. Requiring the sender to idly wait for policy compliance checking which requires substantial processing resources during an interactive session with package manager 302 may be unacceptable to the sender. Therefore, policy manager 308 also interacts with delivery manager 306 to enforce policy upon packages queued for delivery.

Figure 4:
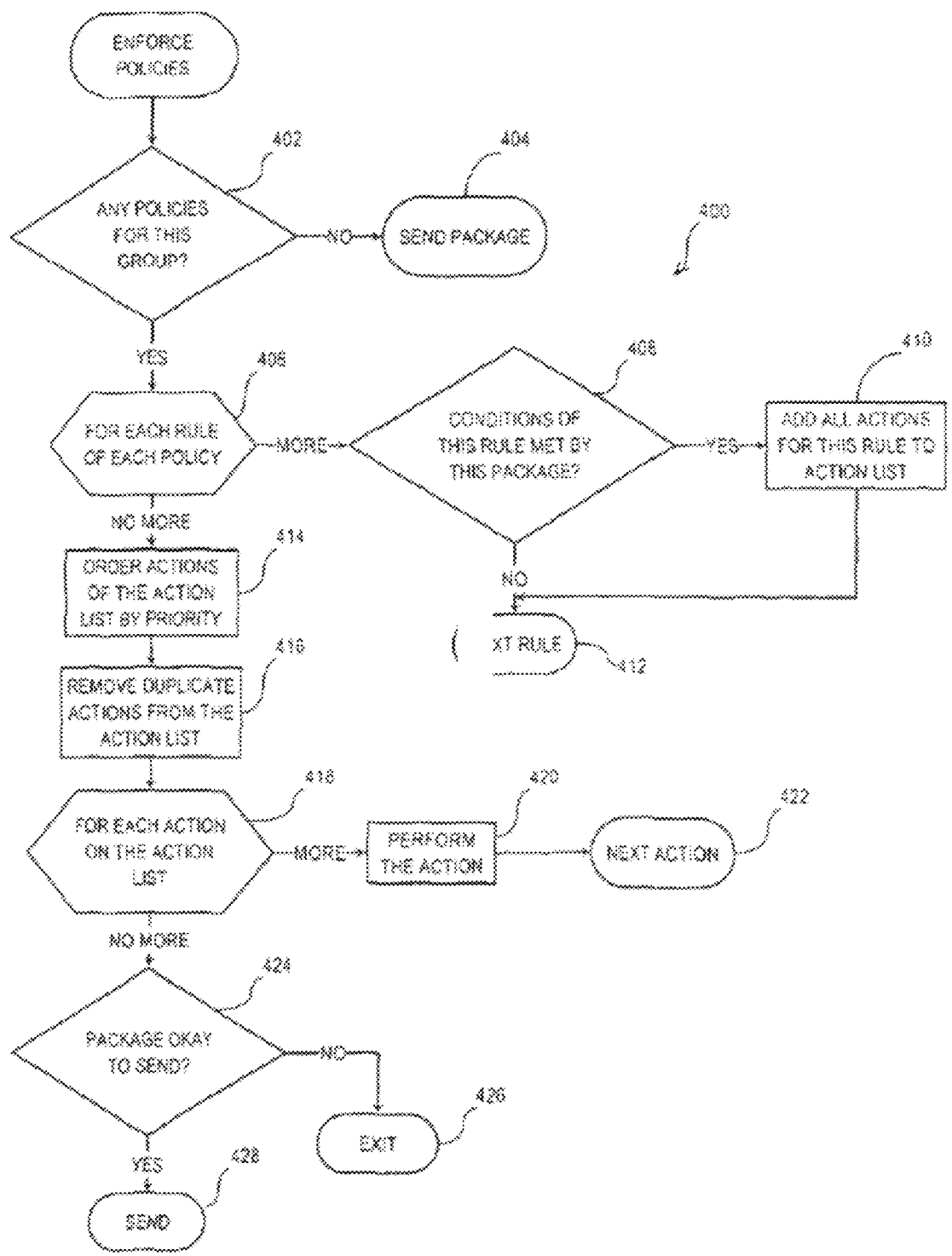
FIG. 4 is a logic flow diagram of the enforcement of policies by the server of FIG. 2 in accordance with the present invention.

Policy manager 308 enforces policy within either package manager 302 or delivery manager 306 as illustrated by logic flow diagram 400 (FIG. 4). In test step 402, policy manager 308 determines whether any policies exist for the group by which the sender is provided access to system 100 (FIG. 1). In particular, policy manager 308 (FIG. 3) retrieves the sender's user record 204 and, from user record 204 (FIG. 2), retrieves group record 202 representing a group of users to which the sender belongs as defined by the policy authority. Group record 202 can include pointers to one or more policy records such as policy record 208 or, alternatively, nil to indicate that no policies are established for the policy authority. If no policies are established for the policy authority of the sender, e.g., if group record 202 includes nil data to indicate no such policies are established, processing by policy manager 308 (FIG. 3) transfers to terminal step 404 (FIG. 4) in which the sending of the subject package is resumed and processing according to logic flow diagram 400 terminates.

Figure 6:
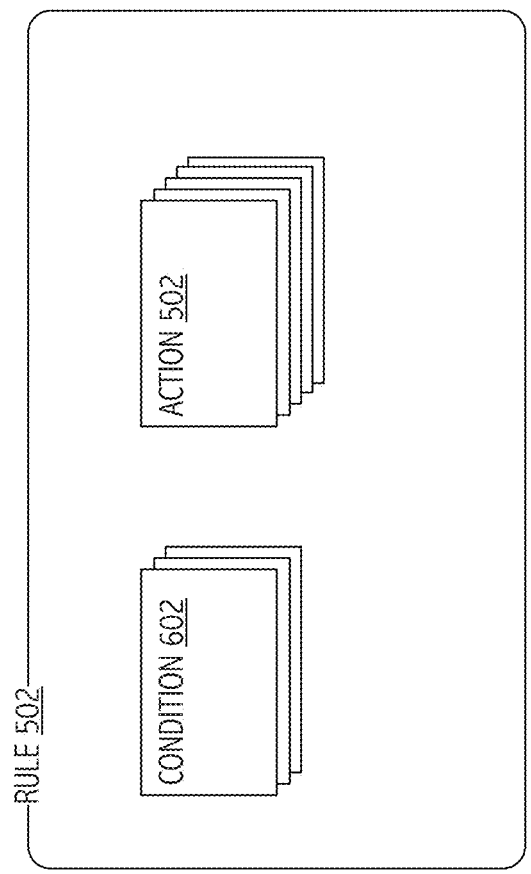
FIG. 6 is a block diagram of a rule of the policy of FIG. 5 is greater detail.
Figure 5:
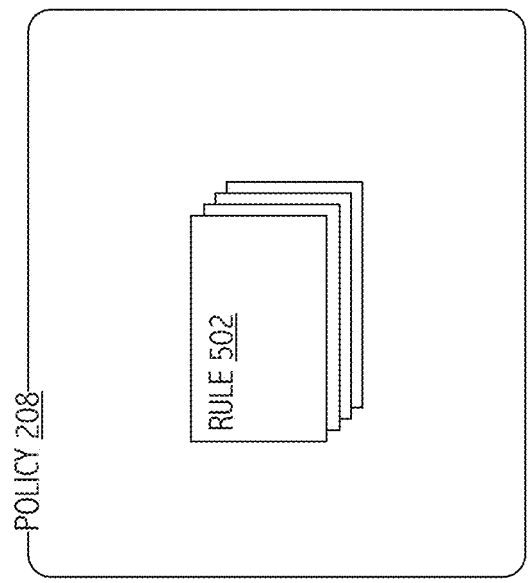
FIG. 5 is a block diagram of a policy in accordance with the present invention.

If one or more policies are established for the policy authority of the sender, processing transfers to loop step 406. Loop step 406 and next step 412 define a loop in which each rule of each policy is processed according to steps 408-410. Each policy includes one or more rules. For example, policy record 208 (FIG. 2 and shown in greater detail in FIG. 5) includes one or more rule records 502. Each rule record, e.g., rule record 502, includes one or more condition records 602 (FIG. 6) and one or more action records 604. During a particular iteration of the loop of steps 406-412 (FIG. 4), the rule processed according steps 408-410 is referred to herein as the subject rule.

In test step 408, policy manager 308 (FIG. 3) determines whether the conditions represented by the condition records of the subject rule are collectively met by the subject package. As described in greater detail below, each condition, e.g., condition record 602 (FIG. 6), specifies a boolean expression involving an attribute of a package. Various attributes of a package are described in greater detail below. Briefly, such attributes can include the sender, one or more recipients, the subject, the message body, delivery attributes, post handling procedures, and one or more attached files. Boolean expressions involving the sender and/or recipients of a package can specify all or part of e-mail addresses, for example using a regular expression. One possible use of e-mail addresses in a condition would be to distinguish recipients within an organization of which the sender is a member from recipients outside such an organization. Boolean expressions involving textual attributes such as subject and message body can be used to search for inappropriate terms which can be embarrassing to the policy authority and/or risk liability of the policy authority or to detect dissemination of confidential information. Boolean expressions involving delivery attribute and post delivery handling procedures can be used to limit potentially excessive and expensive use of system 100 by the sender. Boolean expressions involving attached data files can be used to detect the spread of malicious programs and dissemination of confidential information.

Figure 9:
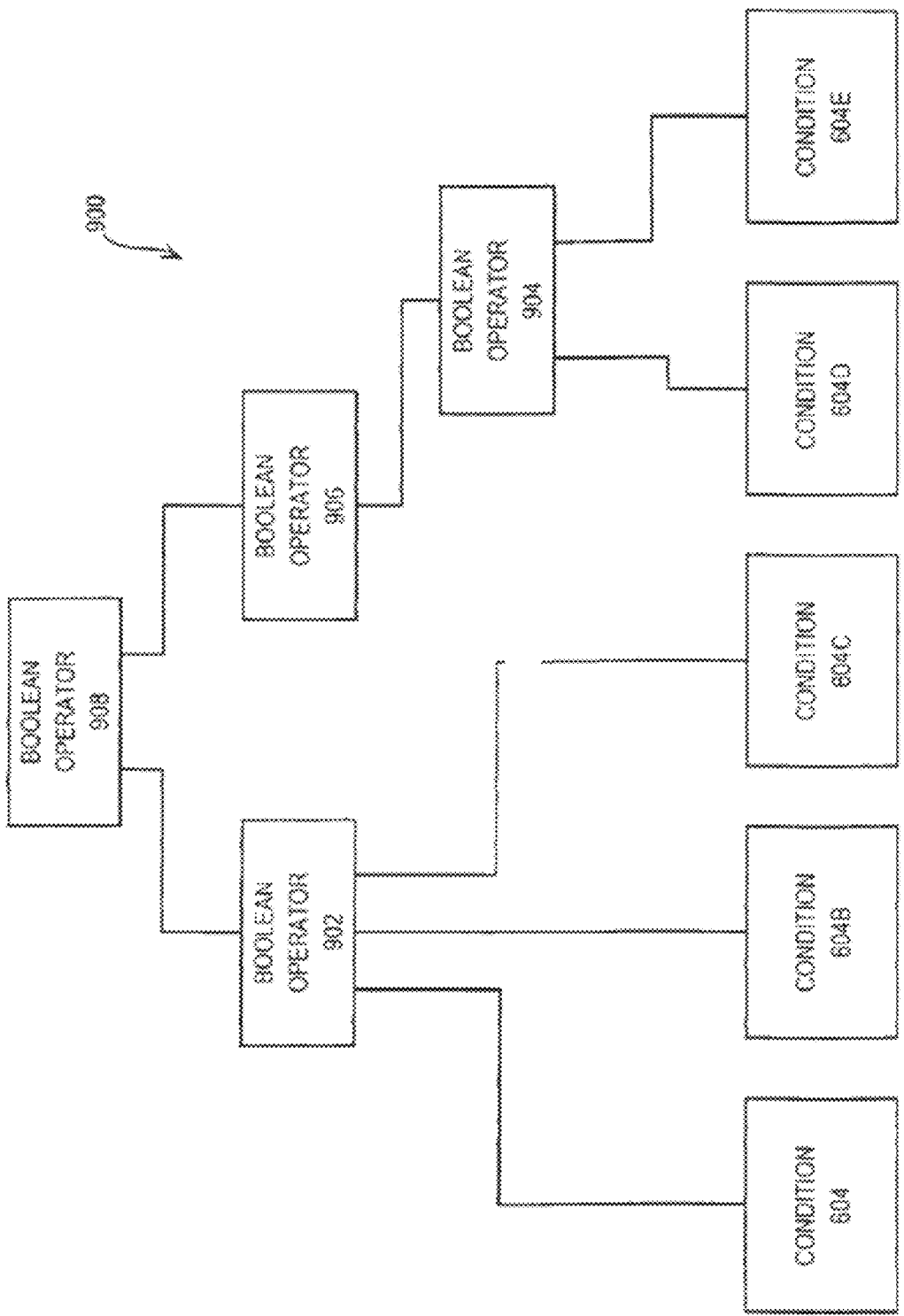
FIG. 9 is a block diagram illustrating interrelationships of conditions through boolean operators.

The conditions of a rule, e.g., all condition records 602 of rule record 502, are related to one another through boolean operators. FIG. 9 shows a tree structure 900 in which a number of conditions, e.g., conditions 602 and 602B-E, are related to one another by boolean operators 902-908. In this illustrative example, (i) boolean operator 902 specifies a logical "OR" relation between conditions 602 and 602B-C, (ii) boolean operator 904 specifies a logical "AND" relation between conditions 602D-E, (iii) boolean operator 906 specifies a logical negation of the intermediate result of boolean operator 904, and (iv) boolean operator 908 specifies a logical "AND" relation between the intermediate result of boolean operator 902 and the intermediate result of boolean operator 906.

If policy manager 308 (FIG. 3) determines that the conditions of the subject rule, collectively in accordance with logical relations to one another, are not satisfied by the subject package, processing transfers from test step 408 (FIG. 4) to next step 412, skipping step 410, and the next rule is processed according to the loop of steps 406-412. Conversely, if policy manager 308 (FIG. 3) determines that the conditions of the subject rule, collectively in accordance with logical relations to one another, are satisfied by the subject package, processing transfers from test step 408 (FIG. 4) to step 410.

In step 410, policy manager 308 (FIG. 3) adds all actions for the subject rule to a list of actions for the subject package. This list is initialized to be empty upon initiation of processing according to logic flow diagram 400 (FIG. 4) and at least prior to processing according to the loop of steps 406-412. After step 410, processing transfers to next step 412 and the next rule is processed according to the loop of steps 406-412. Once all rules of all policies of group record 202 (FIG. 2) have been processed according to the loop of steps 406-412 (FIG. 4), processing transfers to step 414.

In step 414, policy manager 308 (FIG. 3) orders the actions of the list of action according to priority. Some actions work better if performed before other actions. For example, if an action modifies the body of a message of a package and another action forwards a copy of the package to a predetermined recipient, it is preferred that the copy include the modified body. In other words, it is preferred that the modification action precedes the forwarding action.

Figure 10:
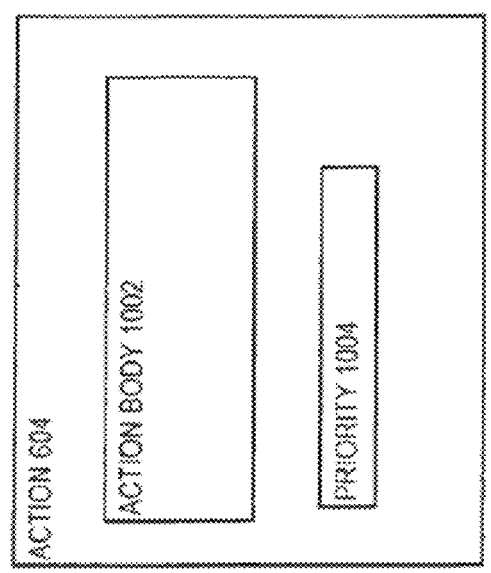
FIG. 10 is a block diagram showing an action of the rule of FIG. 6 in greater detail.

FIG. 10 shows action 604 in greater detail. Action 604 includes an action body 1002 which specifies the specific action to be taken when performing action 604, and a priority 1004. Priority 1004 is established by the policy authority and, in step 414 (FIG. 4), policy manager 308 (FIG. 3) sorts actions of the list such that higher priority actions are performed before actions of lower priority.

Figure 11:
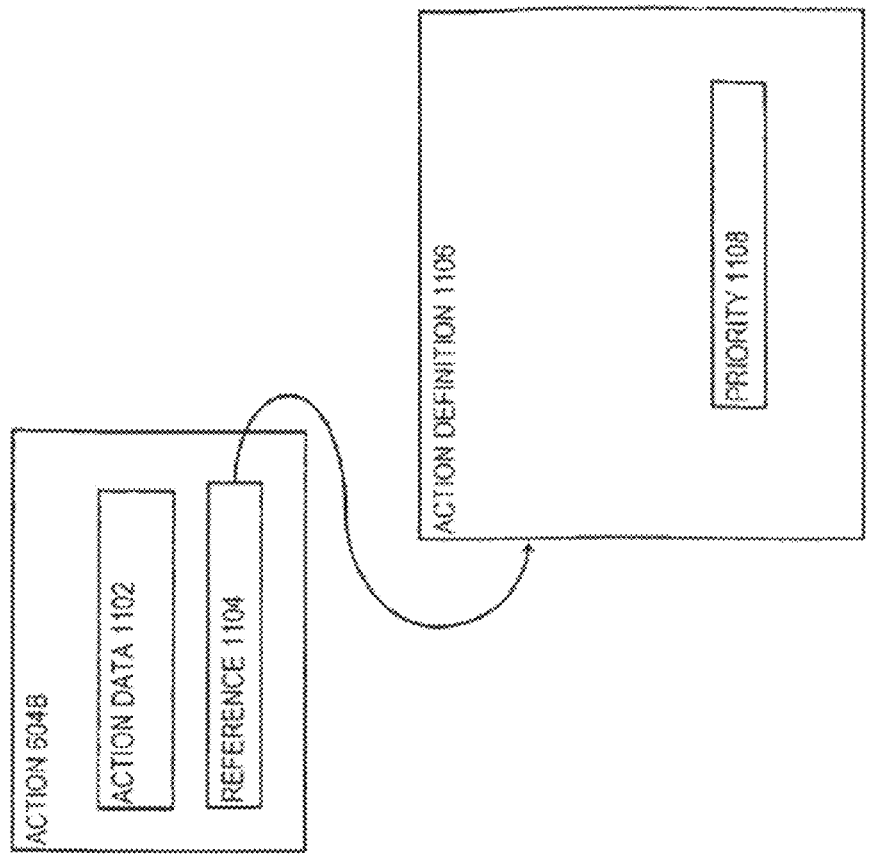
FIG. 11 is a block diagram showing an alternative embodiment of the action of the rule of FIG. 6.

FIG. 11 shows an action 604B in accordance with an alternative embodiment. Action 604B includes action data 1102 and a reference 1104 to an action definition 1106. Action data 1102 specifies data relevant to the action represented by action 604B. For example, if action. 604B specifies that a copy of the package is to be forwarded, action data 1102 can specify an e-mail address to which the copy is forwarded. Action definition 1106 specifies the details of the action to be taken and includes a priority 1108. Priority 1108 is established by the policy authority and, in step 414 (FIG. 4), policy manager 308 (FIG. 3) sorts actions of the list such that higher priority actions are performed before actions of lower priority.

After step 414 (FIG. 4), processing transfers to step 416. The list of actions to be performed with respect to the subject package can contain duplicate, redundant actions. For example, a single package can satisfy more than one set of conditions thereby potentially adding identical actions to the list of actions. Accordingly, policy manager 308 (FIG. 3), in step 416 (FIG. 4), removes duplicate actions from the list of actions to perform with respect to the subject package. Thus, each action is performed only once for the subject package.

It is appreciated that the relative order of steps 414-416 is not important. For example, step 416 can be performed before step 414.

Loop step 418 and next step 422 define a loop in which policy manager 308 (FIG. 3) performs each of the actions of the list of actions in step 420 (FIG. 4) for the subject package. Actions performed by policy manager 308 (FIG. 3) in step 420 (FIG. 4) and specified by action record 604 (FIG. 6) generally affect the delivery of the subject package. While there are many types of actions which can affect delivery of the subject message, three (3) major categories are particularly useful in conjunction with the illustrative embodiment described herein. In particular, actions can (i) interrupt delivery of the package, (ii) log handling of the package, and/or (iii) modify the package.

Actions in the first category include blocking the package outright, blocking the package pending review of the package, and delaying delivery of the package. Policy manager 308 (FIG. 3) blocks the subject package outright by so marking the package. Delivery manager 306 is configured to retrieve from delivery queue 304 and deliver only those packages not marked as blocked. Policy manager 308 blocks a package pending review by blocking the package in the manner described above, placing the package or a reference to the package on a review queue 310, and notifying an administrator that a package has been pushed to review queue 310. The administrator can be a human agent of the policy authority who reviews questionable packages and who is notified by a simple e-mail message in an illustrative embodiment. Alternatively, the administrator can be all or part of one or more computer processes which parse and analyze packages more thoroughly than does policy manager 308 to render a decision as to whether to deliver the packages. In addition, both a human administrator and a computer-implemented administrator can be used in conjunction with one another. In any case, the administrator, after review of the subject package, instructs policy handler 308 to block the package outright if the package is objectionable or instructs policy handler 308 to queue the package for delivery, i.e., mark the package as no longer blocked, otherwise. An action which delays delivery of the package can be used, for example, to manage network loads or to schedule release of information in which timing of release of the information is important. It should be noted that delivery of a package can also be delayed by modifying a delivery date and time attribute of delivery attributes 716 (FIG. 7) to represent a later time and date for delivery.

Actions by policy manager 308 which log handling of a package include saving a copy of the package, sending a copy of the package, and notification of actions performed on the package. Policy manager 308 saves a copy of the package by storing the copy in a predetermined location within datastore 120. Copies of packages stored in the predetermined location within datastore 120 form a log of correspondence of interest to the policy authority. Policy manager 308 can send a copy of a package to a predetermined entity, e.g., at a predetermined e-mail address. The e-mail address can specify a human agent of the policy authority to be notified of packages meeting certain conditions or can specify an e-mail address at which packages meeting other conditions are archived. The sender or another party can be alerted by notification e-mail messages that one or more actions have been taken with respect to a package. For example, actions taken by policy manager 308 through interaction with delivery manager 306 do not provide immediate feedback to the user regarding the processing of the package in this illustrative embodiment. For example, an action can notify the sender that one or more attached data files were removed from the package since malicious computer instructions were detected in those attached data files.

Similarly, an action can notify the sender that the package is blocked pending review for satisfying conditions which can also be enumerated in the notification to the sender. In addition, an action can notify an agent of the policy authorization regarding potential violations by a particular package of the policy established by the policy authority.

While an e-mail message can be used to notify the sender of actions taken with respect to the package, more immediate feedback can be presented to the sender if policy manager 308 interacts with package manager 302. For example, if policy manager 308 is applying policy through interaction with package manager 302, it is likely that the sender is still engaged in an interactive session with package manager 302 and is waiting for some feedback regarding processing of the package. In this situation, policy manager 308 can notify the sender by causing package manager 302 to inform the sender, perhaps by presenting an HTML page which so indicates or through an interprocess communications protocol, that the package violates policy and can explain in what manner the package violates policy. Since such occurs during an interactive session with the sender, the sender has the opportunity to reconfigure the package in a way that satisfies the policy established by the policy authority and resubmit the package for delivery.

Policy manager 308 can perform actions which modify the package but which otherwise do not interrupt delivery of the package. It should be noted that a rule, e.g., rule 502 (FIG. 6), can include all types of actions within action records 604 so, while actions of this third type typically do not interrupt delivery of the package, a single rule can include both this type of package modification actions and actions which interrupt delivery of the package. Action which modify the package modify one or more of the fields of the package. For example, an action can prepend or append text to the message body of the package, can remove all attached data files or those attached data files which satisfy the conditions of the rule, or can modify delivery options or post delivery handling procedures. In addition, actions can modify the package by removing malicious computer instructions from one or more attached data files, can compress one or more attached data files, and can initiate execution one or more computer processes while supplying one or more attached data files to the one or more computer processes. The latter action allows new actions to be developed subsequently and used to process attached data files without requiring creation of new actions recognized by and applied by policy manager 308 (FIG. 3).

After all actions of the list of actions have been performed by policy manager 308 (FIG. 3) in the loop of steps 418-422 (FIG. 4), processing transfers to test step 424. In test step 424, policy manager 308 (FIG. 3) determines whether the subject package is ready to be delivered, i.e., whether the subject package is unblocked. In an alternative embodiment, the subject package is marked as blocked and test step 424 (FIG. 4) is performed by delivery manager 306 (FIG. 3) by determining whether a particular package retrieved from delivery queue 304 is marked as blocked. In either embodiment, if the subject package is blocked, processing transfers to terminal step 428 (FIG. 4) in which processing according to logic flow diagram 400 terminates and the subject package is not delivered. Conversely, if the subject package is unblocked and therefore ready to be delivered, processing transfers to terminal step 426 in which processing according to logic flow diagram 400 terminates and delivery of the subject package in the manner described above terminates.

Package Structure

As described above, packages are addressed from a sender to one or more recipients and can include a message and one or more attached data files. In addition, policy conditions include boolean expressions involving attributes of a package, and application of a rule can modify a package. A package, e.g., package record 206 (FIG. 2), is shown in greater detail in FIG. 7.

Figure 7:
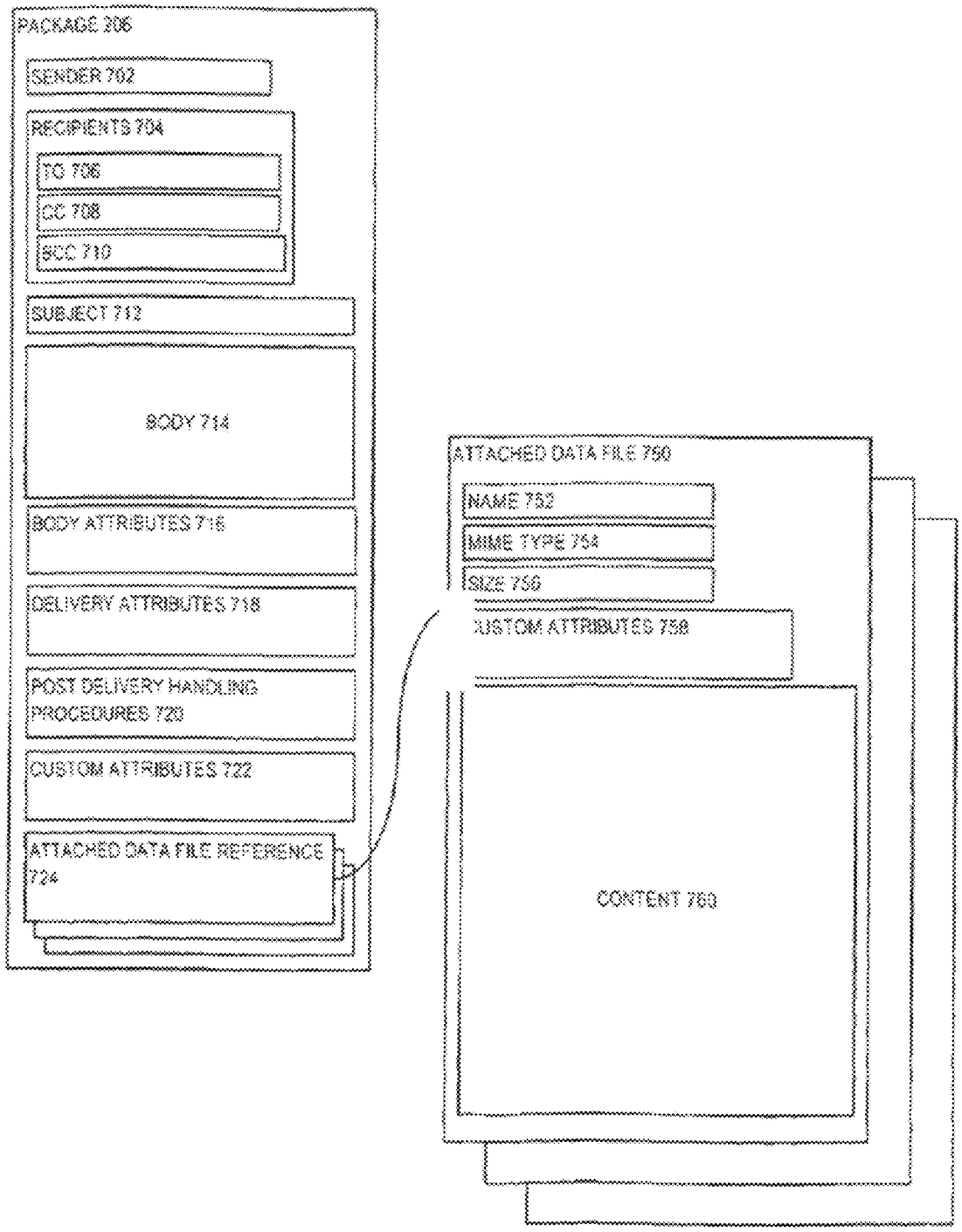
FIG. 7 is a block diagram of a package of FIG. 2 in greater detail.

Package record 206 includes a sender field 702. A condition such as condition 602 (FIG. 6) can include boolean expressions involving sender field 702 (FIG. 7). For example, condition 602 can include a regular expression which can match one or more e-mail addresses. Regular expressions are well-known and are not described herein. Regular expressions are considered a type of boolean expression in which a matching condition is equivalent to a "true" boolean value and a non-matching condition is equivalent to a "false" boolean value. Condition 602 can also include a boolean expression involving an attribute of a user record, e.g., user record 204, corresponding to the sender specified in sender field 702. To detect such a condition, package and account datastore 120 includes data mapping various e-mail addresses to corresponding user records such as user record 204 in one embodiment. In an alternative embodiment, policy manager 308 (FIG. 3) can use an external directory service such as the X.500 Standard or any similar directory service such as Lightweight Directory Access Protocol (LDAP), NetWare Directory Service (NDS), and Active Directory. User record 204 can include classification data which is useful in determining membership of the sender in any of a number of groups. For example, a condition can include a boolean expression which determines whether the sender is in the legal department or sales department of the policy authority or works in a specific office of the policy authority, e.g., a Japanese branch office. By testing for particular senders and/or classes of senders, the policy authority can apply different rules to various senders.

Package record 206 includes recipients field 704 (FIG. 7). Recipients are specified in a number of sub-fields, namely, TO sub-field 706, CC sub-field 708, and BCC sub-field 710 which specify, respectively, direct recipients, carbon-copied recipients, and blind carbon-copied recipients. Recipients—either recipients field 704 itself or any sub-field thereof—can be included in conditions such as condition 602 (FIG. 6) in a manner analogous to that described above with respect to sender field 702 (FIG. 7). For example, recipients can be specified as matching a regular expression or by matching an attribute of a user record, e.g., user record 204 (FIG. 2), corresponding to the recipient field or sub-field. In addition, actions, e.g., as represented by action record 604 (FIG. 6), which send copies of a package do so in this illustrative embodiment by duplicating package record 206 (FIG. 7) and changing contents of TO sub-field 706 to specify the recipient to whom the copy is sent. In addition, the body of the message as represented in body field 714 described below can be modified to identify the copy as such. By testing for particular recipients, the policy authority can configure different rules for recipients within the policy authority than for recipients outside the policy authority. For example, an employer can establish different rules for correspondence between employees than for correspondence with outside parties—e.g., to enforce confidentiality policy.

Subject field 712 (FIG. 7) of package record 206 specifies a textual subject of the package for convenience in categorizing and handling of the package. Body field 714 of package record 206 stores the substantive content of the message of the package represented by package record 206.

Conditions, e.g., condition record 602 (FIG. 6), can match a subject or body using a boolean expression and/or a regular expression. Rules such as rule record 502 can search for inappropriate messages by matching inappropriate words or phrases in subject field 712 (FIG. 7) and/or body field 714.

Body attributes field 716 of package record 206 specifies characteristics of the body represented in body field 714. Such attributes can include, for example, the particular format of the body, e.g., text, rich text format (RTF), or HTML, and the particular character set of which the body is composed. A condition involving body attributes can be used, for example, to detect packages with HTML bodies, and an associated action can convert the HTML body to a text or RTF body, thereby eliminating hypertext links to sites which may be inappropriate from the perspective of the policy authority.

Delivery attributes 718 (FIG. 7) specify the manner in which package 206 is delivered. For example, delivery attributes 718 can specify a relative priority of the package, whether a receipt notification is to be sent to the sender, a time at which to deliver the package, a time at which the package expires, and a code for billing purposes. In addition, delivery attributes 718 can include security attributes specifying, for example, whether a secure connection though computer network 110 (FIG. 1) is required, whether package record 206 (FIG. 7) and attached data file records 750 are to be encrypted while stored in datastore 120 (FIG. 1), whether a sender-specified password is required to retrieve the package, and whether an account password is required to retrieve the package. An account password is the password by which a particular user is authenticated as a prerequisite for access to system 100. For example, the account password of the sender is specified in user record 204 (FIG. 2).

Conditions such as condition record 602 (FIG. 6) can specify specific delivery attributes. For example, packages with weak security attributes or unusually long time periods prior to expiration can be singled out for unusual security scrutiny by the policy authority. Similarly, conditions and rules can be configured to ensure that specific senders are limited to specific billing codes.

Actions of rules, e.g., action record 604, can modify the delivery attributes of a package. For example, a policy authority can force all packages to be sent through secure network channels by detecting all packages with delivery attributes allowing transport through unsecured channels using conditions so configured and associating therewith an action which modifies delivery attributes 718 (FIG. 7) to specify that secure network channels must be used.

Post delivery handling procedures 720 specify the types of actions recipients of package 206 can take with respect to package 206 once received. Post delivery handling procedures are described, for example, in U.S. patent application Ser. No. 09/475,608 filed Dec. 30, 1999 by Jean-Christophe Bandini and Dmitri Dolinsky for "Sender-Controlled Post Delivery Handling of Digitally Delivered Documents" and that description is incorporated herein by reference. Briefly, the sender can allow recipients to handle—e.g., reply to, forward, print, and save—a received message. At issue are (i) security of the message after received by a recipient and (ii) costs of such post-receipt handling that can be attributed to the sender. Rules can be established with conditions which include boolean expressions involving post-delivery handling procedures 718 to limit replies or pre-paid replies of a package, the size of a pre-paid reply package, printing or saving of a package, and/or to only allow reply packages of a threshold level of security.

Custom attributes 722 can be used to specify characteristics of package 206 other than those specified in the other fields of package 206. In this illustrative embodiment, custom attributes 722 include a list of associated name/value pairs. In each pair, a name identifies the particular attribute and the value specifies the particular value of that attribute for package 206. Custom attributes 722 make package 206 extensible since attributes which are not conceived at the time system 100 is implemented can be added and represented in custom attributes 722.

Package record 206 can include one or more attached data files. In particular, package record 206 includes attached data file records 724 each of which references a respective data file which is considered attached to package record 206. Attached data file 750 is such an attached data file.

Attached data file 750 includes a name 752, a MIME (Multipurpose Internet Mail Extension) type 754, a size 756, custom attributes 758, and substantive content 760. Name 752 specifies a name of attached data file 750. MIME type 754 specifies a type of data file. For example, MIME type 754 can specify that attached data file 750 is a Microsoft Word document or a text document or a JPEG image. Size 756 specifies the size of attached data file 750. Custom attributes 758 represent subsequently defined attributes in a manner analogous to that described above with respect to custom attributes 722. For example, custom attributes 758 can include a number of attribute names and associated respective attribute values.

Conditions involving data file names as specified by name 752 can be used to detect specific files to detect packages which include confidential data files. Conditions involving data file types as specified by MIME type 754 can be used to detect packages to which data files of specific types are attached to thereby limit possible leaks of confidential data files. For example, to limit potential leaks of confidential financial information, a rule can be established to block all packages to which spreadsheet data files are attached. While it is appreciated that the sender can change the name of a data file or convert the data file from one type to another to circumnavigate such rules, these rules would serve as an explicit reminder to the sender regarding the policy authority's established policy and that such circumnavigation represents premeditated violation of the established policy.

Conditions involving size 756 can be used to limit the size of attached data files of a package or the total size of a package. In this illustrative example, the policy authority is charged for use of system 100 and the size of packages sent is one factor determining the amount to be charge to the policy authority. Accordingly, the policy authority can limit costs by limiting the size of attached data files and/or the size of the entire package.

Conditions involving content 760 can examine the substantive content of attached data file 750. Such conditions typically require more processing resources than are required for conditions involving other attributes of attached data files and of package 206. Accordingly, conditions involving content 760 are typically enforced by policy manager 308 (FIG. 3) through delivery manager 306 rather than through package manager 302. As a result, the sender receives relatively quick acknowledgment of submission of package 206 (FIG. 7) and can go on to perform other tasks while policy manager 308 (FIG. 3) and delivery manager 306 asynchronously examine content 760 (FIG. 7) of attached data file 750 of package 206. Such conditions can determine whether inappropriate words and/or phrases are present in the substantive content of the attached data file or can scan the substantive content for malicious computer instructions such as Trojan horses or viruses.

It should be noted that some data files include one or more embedded data files. For example, attached data file 750 can be an archive of one or more data files compressed in accordance with the known, and ubiquitous ZIP compression format. Policy manager 308 therefore extracts embedded data files from any attached data files 750 and applies policies to each of the extracted files and extracts any embedded data files from the extracted data files in a recursive fashion. As a result, policy application cannot be avoided by merely compressing an attached data file which would otherwise violate policy.

Policy Manager 308

Figure 8:
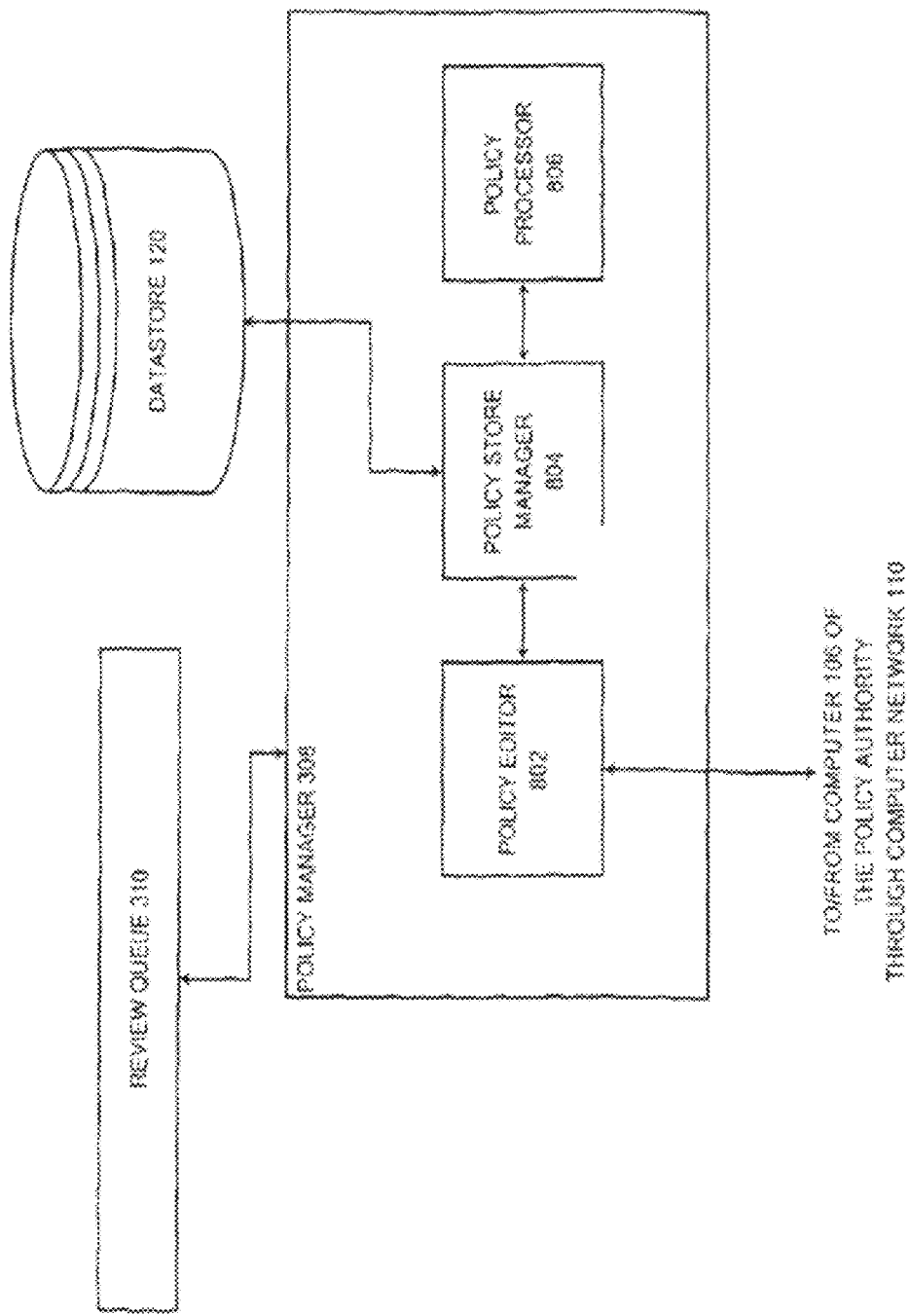
FIG. 8 is a block diagram of a policy manager of FIG. 3 is greater detail.

Policy manager 308 is shown in greater detail in FIG. 8. Policy manager 308 includes a policy editor 802, a policy store manager 804, and a policy processor 806, each of which is all or part of one or more computer processes executing within server 108 (FIG. 1).

Policy store manager 804 stores policy records, e.g., policy record 208 (FIG. 2), in datastore 120 and associates the policy records with group records, e.g., group record 202, to which the policy records pertain. In this illustrative embodiment, each group record includes a reference to a list of all policy records which pertain to the group, and each policy record includes a reference to the one or more group records representing the groups to which the policy record pertains.

The policy records stored by policy store manager 804 (FIG. 8) can be in any format convenient for policy processor 806. For example, policy records can represent policies in any of the textual formats described below or in a binary representation in which similar information is stored. Policy records can be stored as one or more flat data files, as a relational database, or as an object oriented database. Flat data files, relational databases, and object oriented databases are known and are described further herein.

Policy processor 806 (FIG. 8) includes logic which implements policies of a policy authority in the manner described above with respect to logic flow diagram 400 (FIG. 4).

Policy editor 802 (FIG. 8) interacts with the policy authority through computer system 106 (FIG. 1) and computer network 110 to define one or more policies, policy record 208 (FIG. 2), which are applicable to packages sent by members of the policy authority. Policy editor 802 (FIG. 8) can interact with the policy authority in any of a number of ways. For example, the policy authority can submit a textual data file specifying a policy and policy editor 802 can parse the textual data file, form a policy record such as policy record 208 (FIG. 2) and submit the policy record to policy store manager 804 (FIG. 8) for storage in datastore 120. Possible textual formats for policies are described more completely below.

Alternatively, policy editor 802 can provide an interactive interface by which the policy authority can add, delete, and modify rules of a policy. Similarly, the interface provides mechanisms by which the policy authority can add, delete, and modify conditions and actions of a specific rule when adding or modifying a rule of the policy. In specifying—by addition or modification—a condition, the policy authority is prompted for a parameter of a package, a relation, and a data value. Parameters include, for example, those described above with respect to package 206 in FIG. 7, and the policy authority can be presented with a list of such parameters from which to select a parameter. Relations can include such relations as "contains," "is equal to," "is greater than," "is less than," and negations of each such relation, and the policy authority can select such a relation from a list of available relations. The policy authority specifies a data value by entering the value. Policy editor 802 (FIG. 8) in this illustrative embodiment verifies that the entered data value conforms to any validity constraints imposed upon the selected package parameter. For example, if the selected package parameter of the condition is a date, policy editor 802 ensures that the condition data value entered by the policy authority is a valid date in the same manner that the package parameter is verified to be a valid date.

In one embodiment, the interactive interface of policy editor 802 is implemented as a set of one or more HTML forms. HTML forms are known and are not described further herein. In an alternative embodiment, the interactive interface is implemented by all or part of one or more computer processes executing within computer system 106 (FIG. 1) which converts the policies specified by the policy authority to one or more data files representing the policies in a format which is recognized by policy editor 802 (FIG. 8). For example, the format can be any of the textual formats described below.

If policy editor 802 recognizes policy in a standard format, such as textual, conventional editors executing within computer system 106 (FIG. 1) can be used by the policy authority to specify a policy which is submitted through computer network 110 to server 108 and policy editor 802 (FIG. 8). For example, the NOTEPAD and WORDPAD programs available from Microsoft Corporation of Redmond, Wash. in conjunction with their WINDOWS® family of operating systems can be used to edit policies in the textual formats described below.

Two illustrative formats for policy specification are described herein: a rule list and a scripting language. Each can be represented textually, e.g., in the known ASCII and XML formats, or as binary data.

The rule list format is a simple list of rules, each of which is a pairing or association of a list of one or more conditions with a list of one or more actions. The following grammar illustrates the rule list format:

```
Policy = list of Rule
Rule = Conditions Actions
Conditions = list of Condition
Actions = list of Action
Condition = a boolean expression using zero or more instances of
    DeliveryAttribute and/or zero or more instances of
    ExternalAttribute
DeliveryAttribute = PackageAttribute OR SenderAttribute OR
    RecipientAttribute
ExternalAttribute = CurrentTime OR CurrentDate OR
    RandomNumber OR etc.
PackageAttribute = Subject OR Body OR
    CustomAttribute(AttributeName) OR list of FileAttribute
FileAttribute = FileName OR MIMEType OR FileSize OR
    FileTextualContent OR CustomAttribute(AttributeName)
    OR list of FileAttribute
SenderAttribute = SenderEmailAddress OR
    SenderAttributeFromDirectoryLookup(AttributeName)OR
    CustomAttribute(AttributeName)
RecipientAttribute = RecipientEmailAddress OR
    RecipientAttributeFromDirectoryLookup(AttributeName)
    OR CustomAttribute(AttributeName)
Action = Block OR SendCopyTo(recipient) OR SaveCopy OR
    BlockUntilReviewed OR RemoveAllAttachments OR
    RemoveAttachmentsMatchingCondition OR
    AppendToBody OR PrependToBody OR
    ModifyDeliveryOption(Option, NewValue) OR
    ConvertAttachmentFormat(NewFormat) OR
    CompressAttachment OR
    RunProgramForAttachment(ProgramName) OR
    CleanVirusFromAttachment OR etc.
```

FileAttribute has a recursive definition since some file formats include a list of embedded files. For example, compressed data formats such as the popular and known ZIP compressed data format embeds a number of files within a compressed file. In addition, each embedded file can also have embedded files, e.g., can be a compressed data file in the ZIP format.

Each policy data file configured by the policy authority can be simple list of rules such that all rules apply to all members of the policy authority. Alternatively, rules of the list can be grouped and designated as applicable to groups of one or more members of the policy authority. Accordingly, the policy authority can establish different policies for one group, e.g., the legal department, relative to policies established for another group, e.g., the sales department.

The scripting language format represents policy established by the policy authority in the form of a scripting language. In one embodiment, a number of predefined objects express conditions in the known ECMA-262 scripting language of the European Computer Manufacturers Association (ECMA). ECMA-22 (sometimes referred to as ECMAscript or JavaScript) is known and is not described further herein. In this embodiment, actions are represented by predefined methods in the ECMA-262 scripting language.

The following objects can represent conditions: package. subject, package.body, package.sendDate, package.priority, package.file.length, package.file[index], package.file [index].name, package.file[index].mimeType, package.file [index].hasVirus( ), and package.file.scanText("regular expression").

The following methods can represent actions: package. block( ), package.addToBccRecipient("e-mail address"), package.saveCopy("SaveFolder"), package.body.append ("This message is privileged as Attorney/Client communication."), and package.files.removeAt(index). In addition, actions can be represented as object properties which can be written in the scripting language. For example, "(URGENT)" can be appended to the subject by the script instruction:

package.subject+="(URGENT)"

Similarly, a package can be limited to secure network protocols by the script instruction:

package.securityOptions|=USE_SSL

The rules list format and script format can be combined. For example, conditions can be expressed in the rules list format while actions are expressed as scripts. Alternatively, conditions can be expressed as scripts while actions are expressed in the rules list format described above. Furthermore, these illustrative formats are exactly that: illustrative. Other formats are possible for specifying conditions and associated actions to be taken if the conditions are satisfied.

Split Policy

As described above, policies can be established which include recipient-specific rules, e.g., rules which test for conditions involving the particular recipients to which a package is to be delivered. Since more than one recipient can be specified for a package, it is possible that a rule is applicable for the package for some, but not all, recipients of the package. For example, delivery of a package can be blocked because of a single recipient but would be otherwise deliverable for the remaining recipients.

In one embodiment, nothing is done to account for different rules affecting different recipients differently. If a package is blocked for one recipient, it is blocked for all recipients. If the package is not blocked but is instead blocked pending review for one recipient, it is blocked pending review for all recipients. In short, the most restrictive recipient controls the handling of the package.

In an alternative embodiment, a package is bifurcated according to recipients of the package for which the policy produces different results. Such is illustrated by logic flow diagram 400B (FIG. 12) which augments logic flow diagram 400.

Processing by policy manager 308 (FIG. 3) transfers from loop step 406 (FIG. 6) to test step 1202 (FIG. 12) for each rule of each policy. In test step 1202, policy manager 308 (FIG. 3) determines whether the rule is recipient-specific, i.e., whether any conditions of the rule depend upon one or more attributes of the recipients. If not, processing transfers to test step 408 (FIG. 4) which is described above and the rule is processed in the manner described above.

Conversely, if the rule is recipient-specific, processing transfers to test step 1204 (FIG. 12) in which policy manager 308 (FIG. 3) determines whether the conditions of the rule are met by any recipients. If not, processing transfers to next step 412 (FIG. 4) and processing continues in the manner described above with respect to logic flow diagram 400.

Conversely, if the conditions of the rule are met by at least one of the recipients of the package, processing transfers to test step 1206 (FIG. 12) in which policy manager 308 (FIG. 3) determines whether the conditions of the rule are met by all recipients of the package. If so, processing transfers to step 410 (FIG. 4) and processing continues in the manner described above with respect to logic flow diagram 400.

Figure 12:
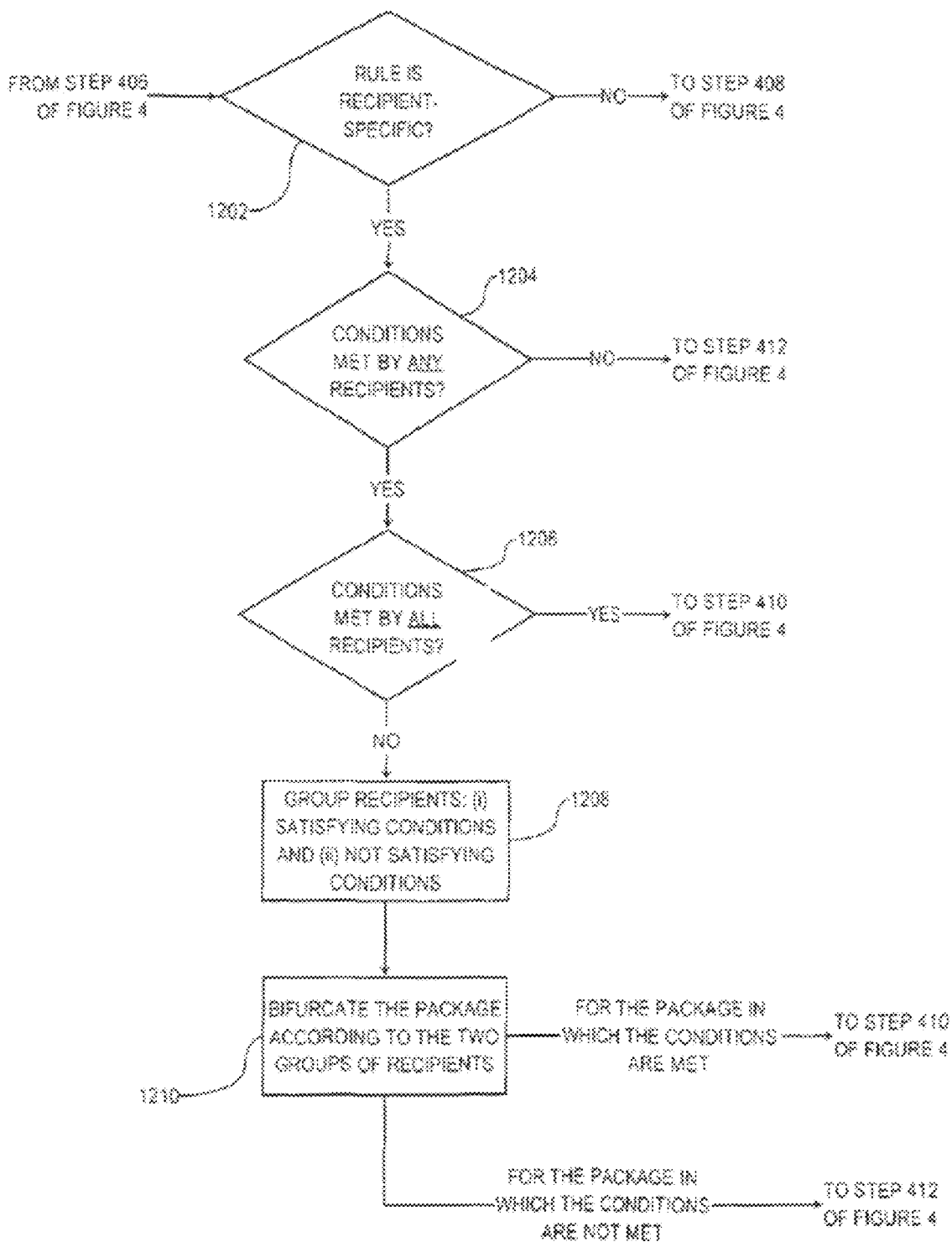
FIG. 12 is a logic flow diagram fragment illustrating an augmentation of the logic flow diagram of FIG. 4 to allow for different policy enforcement to different recipients of the same package.

Conversely, if the conditions of the rule are not met by all recipients of the package, the conditions of the package are met by some, but not all, of the recipients of the package and processing transfers to step 1208 (FIG. 12). In step 1208, policy manager 308 (FIG. 3) divides the recipients into two groups: (i) recipients that satisfy the conditions of the rule and (ii) recipients that do not satisfy the conditions of the rule. In step 1210 (FIG. 12), policy manager 308 (FIG. 3) bifurcates the package according to the two groups of recipients. In particular, policy manager 308 duplicates the package and stores the first group of recipients in recipients field 704 (FIG. 7) in one package and stores the second group of recipients in recipients field 704 of the other package. In addition, the list of actions to perform with respect to the package is duplicated and each copy is associated with a respective one of the bifurcated packages.

Processing of the bifurcated package then continues in separate performances of the steps of logic flow diagram 400 (FIG. 4). In particular, processing of the package for the recipients for whom the conditions of the rule are met as shown in FIG. 12 resumes with step 410 (FIG. 4) while processing of the package for the recipients for whom the conditions of the rule are not met as shown in FIG. 12 resumes with step 412 (FIG. 4). Accordingly, the actions of the subject rule are added to the list of actions for only one of the two bifurcated packages (step 410), namely, the package whose recipients meet the conditions of the subject rule.

The remainder of logic flow diagram 400 is as described above. It should be noted that multiple rules can result in bifurcation of the package, resulting in more than just two copies of the package being addressed to more than two groups of recipients. It should further be noted that not all recipient-specific rules need to result in bifurcation of a package. For example, if a recipient-specific rule includes actions which merely add disclaimer language to a message body, such a rule can be treated as a recipient-independent rule, treating all recipients the same. However, rules involving recipient-specific conditions and which interrupt the delivery of the package can be treated in the manner described above with respect to FIG. 12 to effect uninterrupted delivery of the package to as many recipients as allowable under the policy. In addition, it should be noted that all recipient-independent rules are processed the same with respect to the bifurcated packages. For example, if a rule has no conditions which involve recipients field 704, processing of all bifurcated packages of a single original package, which are identical except for recipients specified in respective recipients fields and respective action lists, pass from loop step 406 (FIG. 4) through test step 1202 (FIG. 12) to test step 408 (FIG. 4) and are processed by steps 408-412 in the same manner.

The above description is illustrative only and is not limiting. Instead, the present invention is defined solely by the claims which follow and their full range of equivalents.

What is claimed is:

1. A method for enforcing policy upon a package to be delivered from a sender to a plurality of recipients through a computer network, including:
   receiving package data which is generated by the sender;
   applying, by a server, a policy to the package, wherein the policy is specified by policy data received from a policy authority of the sender, and the policy specifies a set of actions to be carried out upon satisfaction of a set of conditions, wherein one or more actions interrupts delivery of the package, logs handling of the package, or modifies the package;
   responsive to a determination at the server, that the set of conditions is satisfied by one or more attributes of a first set of recipients, but not a second set of recipients, duplicating the package to provide two instances thereof;
   storing the first set of recipients in a recipients field of the first instance of the package;
   storing the set of actions in an action record of the first instance of the package;
   storing the second set of recipients in a recipients field of the second instance of the package, wherein the action record of the second instance of the package is different from the action record of the first instance of the package;
   delivering the first instance of the package to the first set of recipients, but not to the second set of recipients, upon satisfaction of the set of actions in the action record of the first instance of the package; and
   delaying delivery of the second instance of the package to the second set of recipients upon, at least one action of the set of actions in the of the action record of the second instance of the package, that indicates delayed delivery to the second set of recipients.

2. The method of claim 1, wherein the policy includes one or more recipient-specific rules.

3. The method of claim 1, wherein delaying delivery includes waiting for a delay period to elapse.

4. The method of claim 1, wherein delaying delivery includes blocking delivery of the second instance of the package.

5. The method of claim 1, wherein delivering the first instance of the package to the first set of recipients includes sending a notification message including package retrieval data to the first set of recipients.

6. The method of claim 1, wherein a condition specifies one or more delivery attributes.

7. The method of claim 6, wherein a delivery attribute specifies that a sender-specified password is required to retrieve the respective package.

8. The method of claim 1, wherein an action of the set of actions modifies a body of a message of the respective package.

9. The method of claim 1, wherein an action of the first instance of the package is associated with a first delivery priority and an action of the second instance of the package is associated with a second delivery priority having a lower priority than the first priority, and wherein the delaying delivery is in accordance with the respective priorities of the first and second sets of recipients.

10. A computer program product encoded in one or more non-transitory media, the computer program product including codes executable on one or more processors of a service platform to cause the service platform to perform a method including:
    receiving package data which is generated by the sender;
    applying, by a server, a policy to the package, wherein the policy is specified by policy data received from a policy authority of the sender, and the policy specifies a set of actions to be carried out upon satisfaction of a set of conditions, wherein one or more actions interrupts delivery of the package, logs handling of the package, or modifies the package;
    responsive to a determination at the server, that the set of conditions is satisfied by one or more attributes of a first set of recipients, but not a second set of recipients, duplicating the package to provide two instances thereof;
    storing the first set of recipients in a recipients field of the first instance of the package;
    storing the set of actions in an action record of the first instance of the package;
    storing the second set of recipients in a recipients field of the second instance of the package, wherein the action record of the second instance of the package is different from the action record of the first instance of the package;
    delivering the first instance of the package to the first set of recipients, but not to the second set of recipients, upon satisfaction of the set of actions in the action record of the first instance of the package; and
    delaying delivery of the second instance of the package to the second set of recipients upon, at least one action of the set of actions in the of the action record of the second instance of the package, that indicates delayed delivery to the second set of recipients.

11. The computer program product of claim 10, wherein the policy includes one or more recipient-specific rules.

12. The computer program product of claim 10, wherein delaying delivery includes waiting for a delay period to elapse.

13. The computer program product of claim 10, wherein delaying delivery includes blocking delivery of the second instance of the package.

14. The computer program product of claim 10, wherein delivering the first instance of the package to the first set of recipients includes sending a notification message including package retrieval data to the first set of recipients.

15. The computer program product of claim 10, wherein a condition specifies one or more delivery attributes.

16. The computer program product of claim 15, wherein a delivery attribute specifies that a sender-specified password is required to retrieve the respective package.

17. The computer program product of claim 15, wherein a delivery attribute specifies whether an account password is required to retrieve the respective package.

* * * * *